(12) United States Patent
Darveau et al.

(10) Patent No.: US 6,240,150 B1
(45) Date of Patent: May 29, 2001

(54) METHOD AND APPARATUS FOR FILTERING INTERFERENCE IN A MODEM RECEIVER

(75) Inventors: Michel Darveau, Aylmer; Edgar Velez, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/076,633

(22) Filed: May 12, 1998

(51) Int. Cl.$^7$ ....................................................... H04B 1/00
(52) U.S. Cl. ............................ 375/350; 375/222; 375/261
(58) Field of Search .................................. 375/222, 229, 375/230, 231, 232, 233, 234, 235, 236, 346, 350, 261, 316; 455/307, 60

(56) References Cited

U.S. PATENT DOCUMENTS

| | | | |
|---|---|---|---|
| 4,594,555 | * 6/1986 | Hilton | 329/305 |
| 5,627,859 | * 5/1997 | Parr | 375/229 |
| 5,640,698 | * 6/1997 | Shen et al. | 455/323 |
| 5,659,546 | * 8/1997 | Elder | 370/343 |
| 5,703,903 | 12/1997 | Blanchard et al. | |

* cited by examiner

*Primary Examiner*—Stephen Chin
*Assistant Examiner*—Chieh M. Fan
(74) *Attorney, Agent, or Firm*—Max R. Wood; Swabey Ogilvy Renault

(57) ABSTRACT

A method and apparatus for filtering interference (e.g. transmitter feed-through and RF) in a modem receiver. The method of reducing transmitter feed-through (Tx-FT) interference at a receiver of a modem to obtain a desired receive (Rx) signal having a spectrum at a carrier frequency for input into a QAM demodulator includes attenuating the Tx-FT interference and passing the Rx signal at the carrier frequency using an analog filter. The output signal from the analog filter is converted to a digital representation by a analog-to-digital (ADC) converter. A digital band pass filter is used to pass the Rx signal at the carrier frequency and to attenuate the Tx-FT interference further. A mixer is then used to shift the carrier frequency of the spectrum of the Rx signal to an intermediate frequency. The mixer introduces at least one spectral transmitter feed-through image Tx-FT(I) and a receive signal image Rx(I). A digital low pass filter is used to pass the Rx signal at the intermediate frequency and attenuating the image spectrums Tx-FT(I) and Rx(I). A final decimation function is performed to downsample the Rx signal at a downsampling rate from the second digital filter to match the sampling rate of the QAM demodulator. Interference filtering is improved by dividing the functions between an analog filter prior to conversion and a pair of digital filters after conversion.

22 Claims, 6 Drawing Sheets

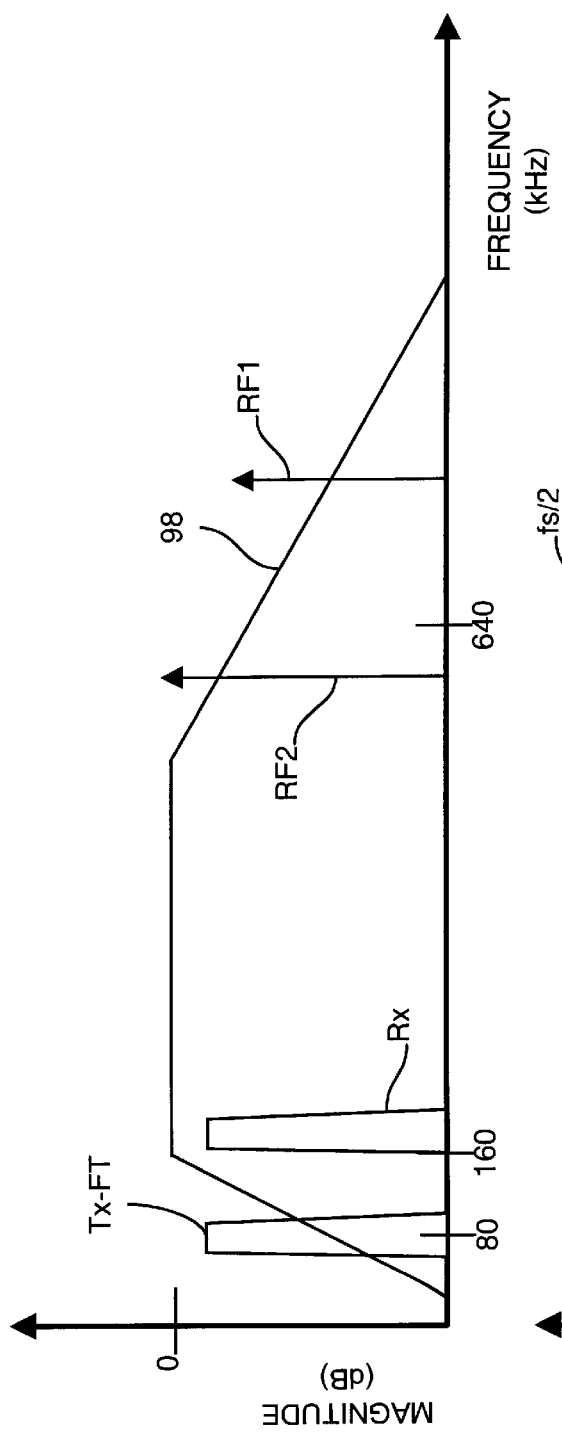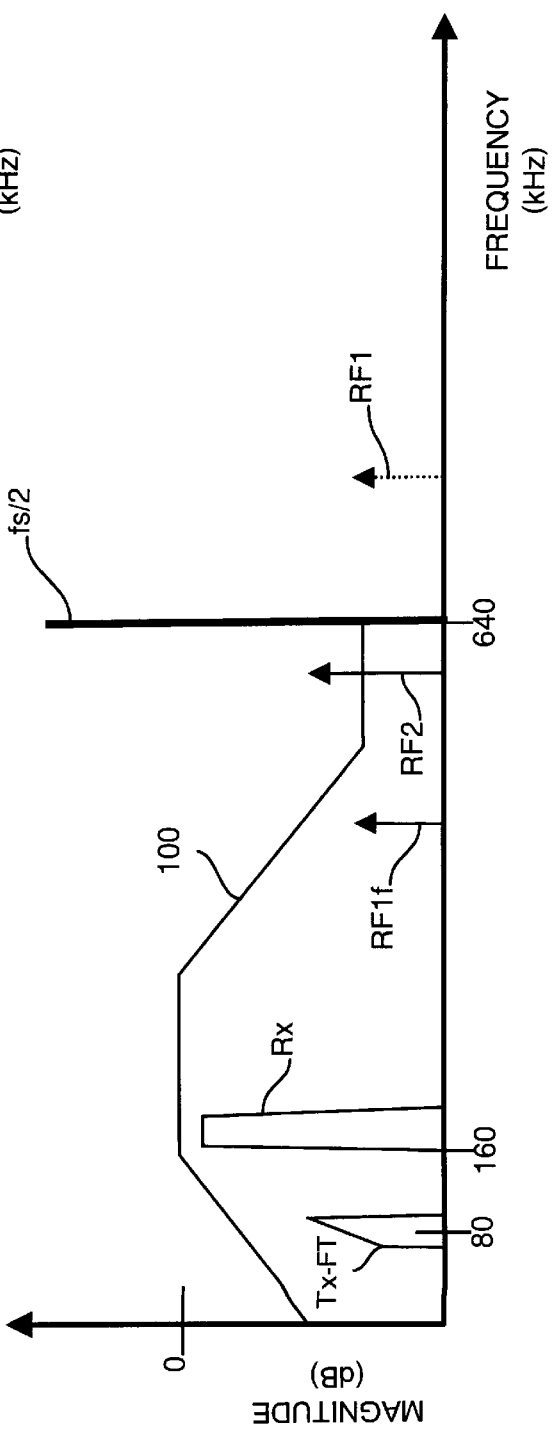

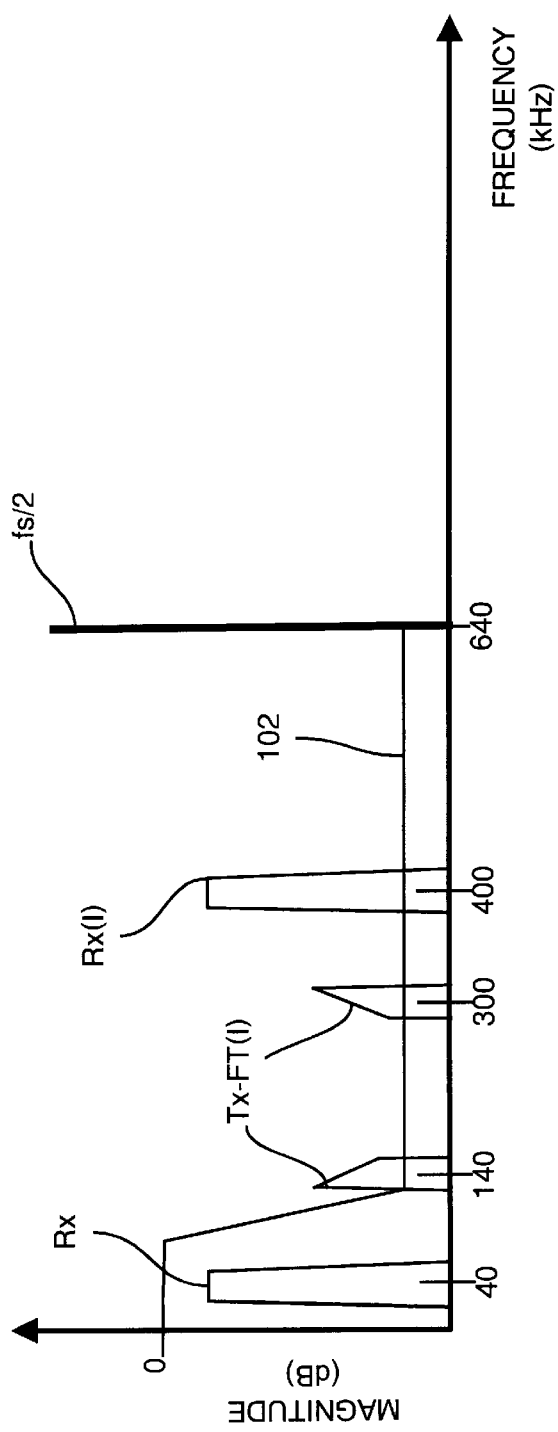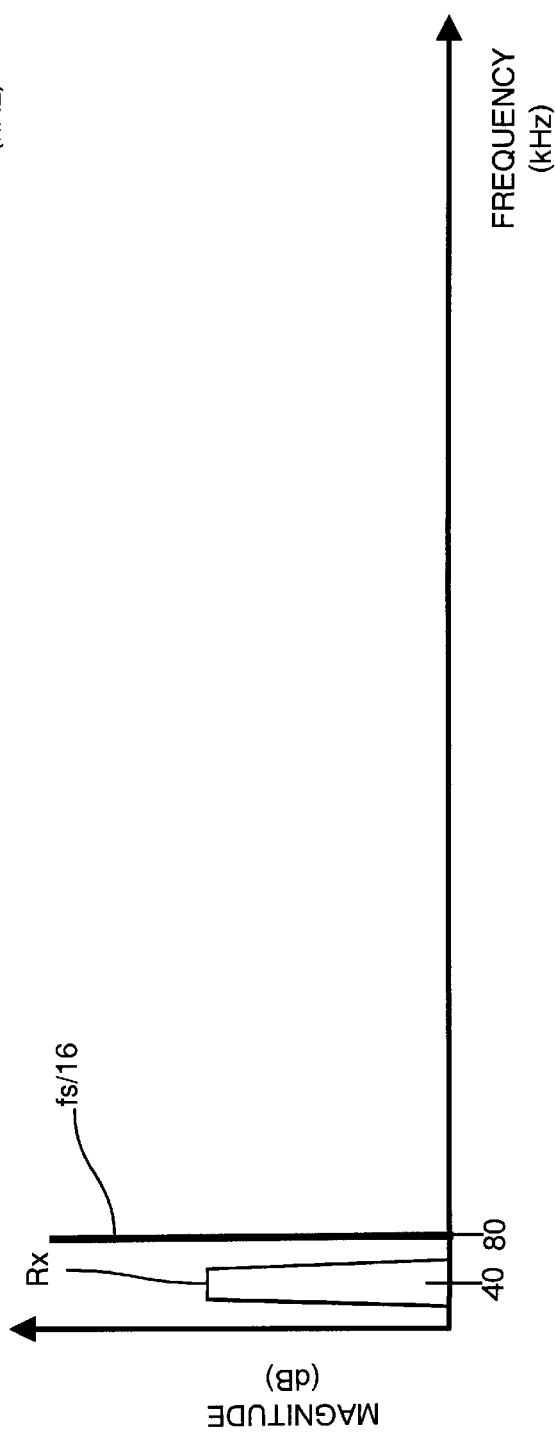

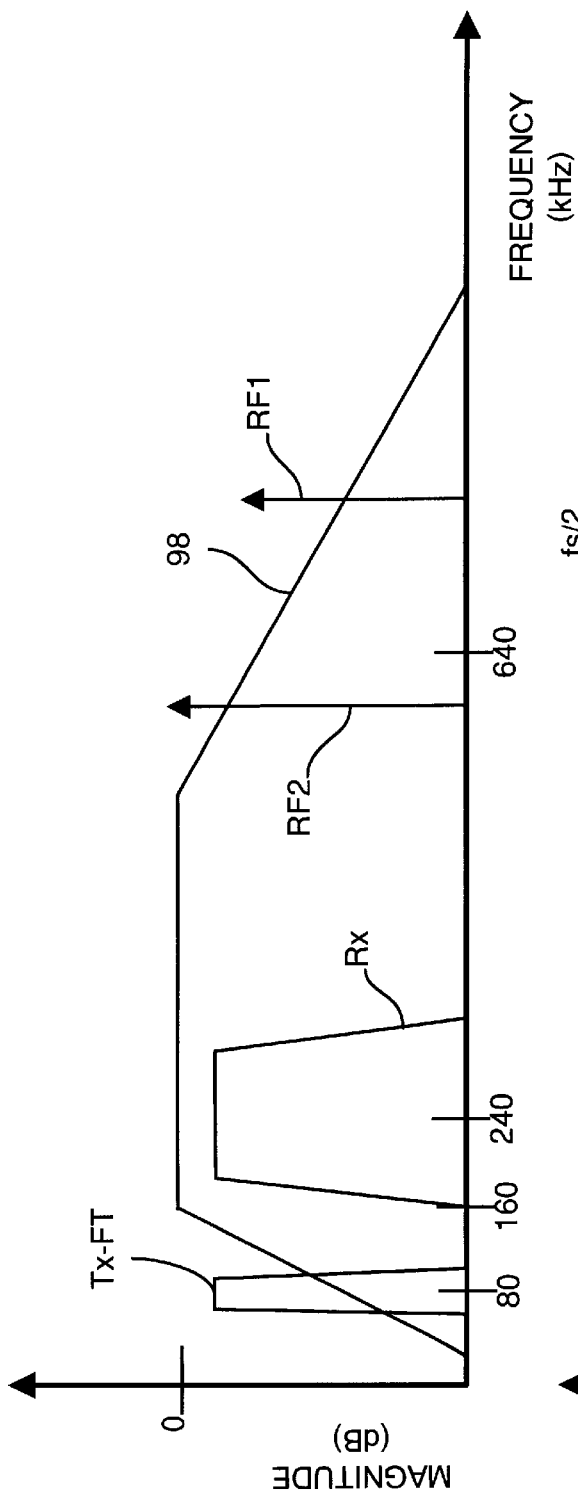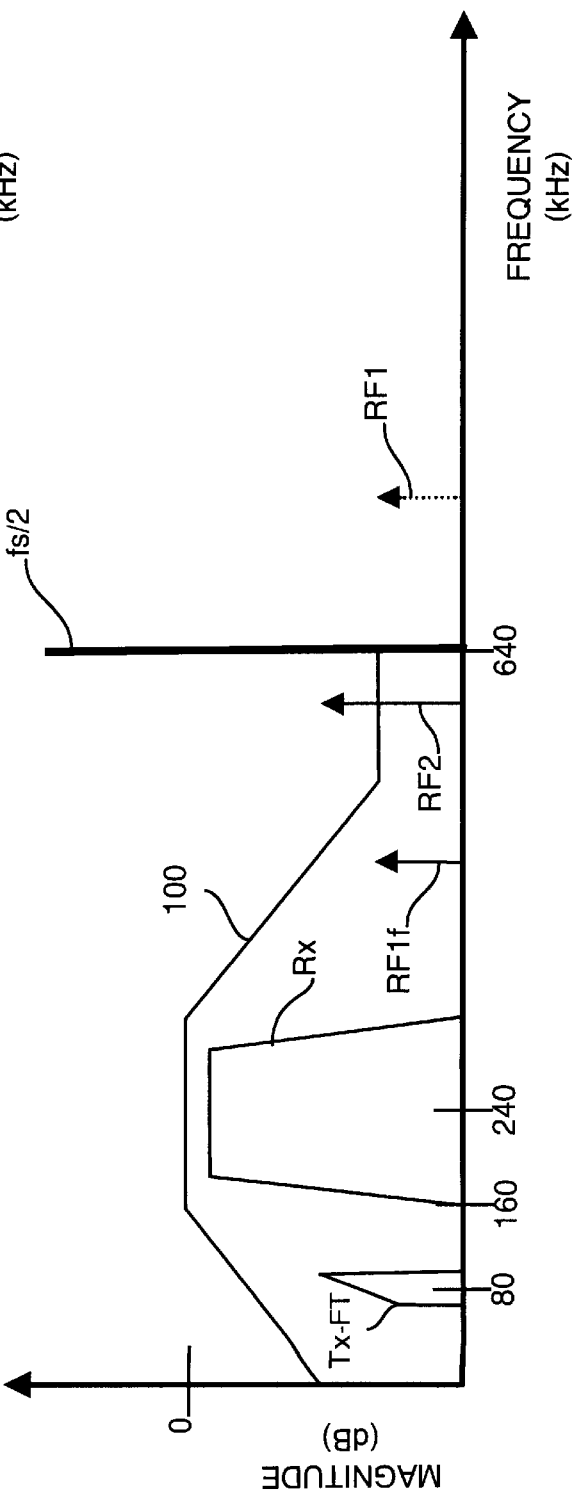

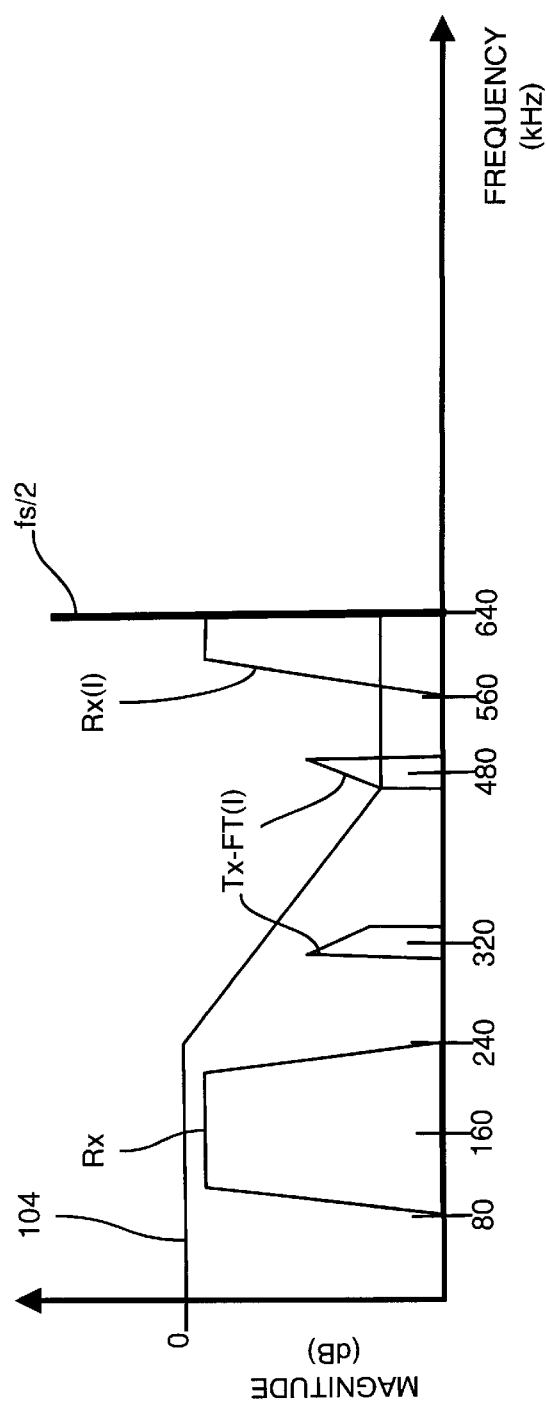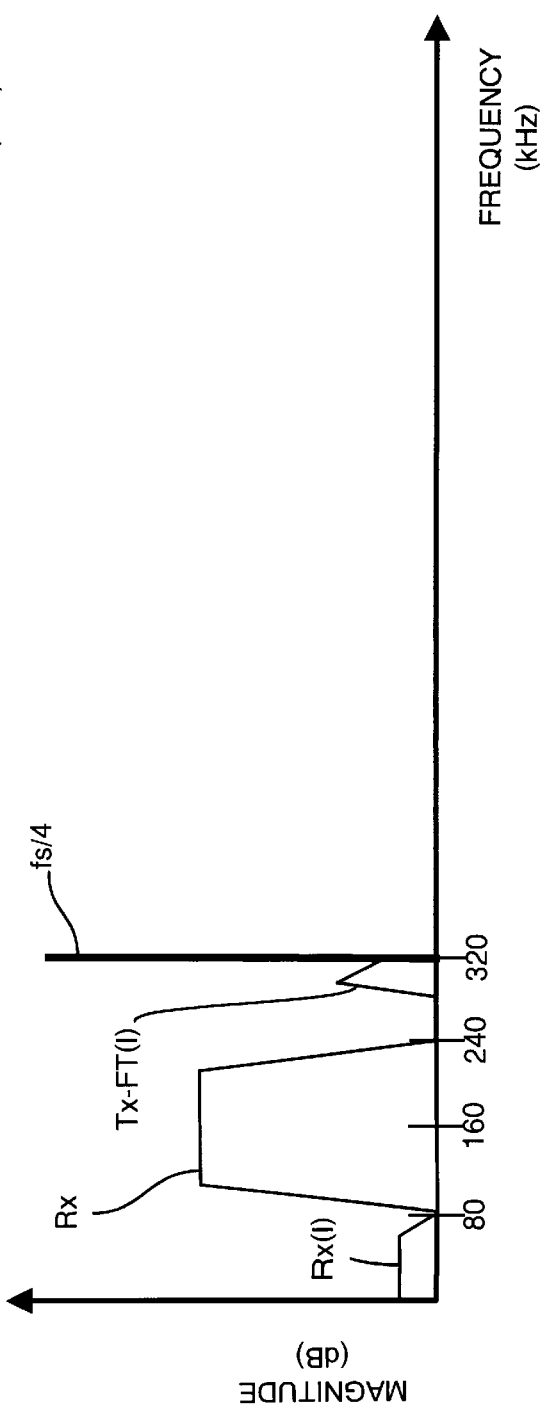

METHOD AND APPARATUS FOR FILTERING INTERFERENCE IN A MODEM RECEIVER

FIELD OF THE INVENTION

This invention relates to the field of interference filtering in modem receivers.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. The ability of modems to operate in the presence of interference is important in modern digital communication systems.

Traditional telephone voiceband modems use the same band (frequency) of transmission for upstream and downstream. However, in digital subscriber line (DSL) based systems there is a need to move to higher frequencies, and at those frequencies coupling between adjacent lines and attenuation of transmit signals at the receiver makes it preferable to use separate bands for upstream (US) and downstream (DS).

There are many potential types of interference including: (1) transmitter feed-through (Tx-FT) which is the result of the transmission signal Tx feeding back into the receive (Rx) path caused by imperfect transhybrid cancellation in 2 to 4 wire interfaces; and (2) radio frequency interference (RFI) which includes ingress from external sources using amplitude modulation (AM) for commercial radio broadcasting.

Tx-FT and RF interference can be very large and must be eliminated in order recover the desired signal with an appropriate signal-to-noise ratio (SNR). Further, due to the large attenuation in the twisted pair, Tx-FT and RF interference can be larger than the received signal, which generally requires additional filtering.

Making a communication system tolerant to interference (Tx-FT and RF) provides several benefits. In particular, an interference tolerant system can make more efficient use of spectrum by being able to share that spectrum with multiple users. Such a system also provides more reliable communications supporting higher transfer rates while utilizing the same bandwidth and power.

Analog filters are usually employed to reduce interference before digitizing the signal at the receiver. Although this provides a theoretical optimal solution, it requires very expensive analog filtering schemes with high-order filters that usually produce other associated problems such as distortion noise and the introduction of non-linearities in the signal.

SUMMARY OF THE INVENTION

An object of the present invention is to provide a method and an apparatus to improve interference filtering at the receiver of a modem.

In accordance with an aspect of the present invention there is provided an apparatus for filtering interference in a receiver of a modem to obtain a desired receive (Rx) signal having a spectrum at a carrier frequency, said method comprising: (a) analog filtering means for attenuating interference signals to first prescribed levels and for passing the Rx signal at the carrier frequency; (b) conversion means for converting output of the analog filtering means to a digital representation; (c) means for shifting the carrier frequency of the spectrum of the Rx signal to an intermediate frequency; and (d) digital filtering means for attenuating the interference signals to second prescribed levels and for passing the Rx signal at the intermediate frequency.

In accordance with another aspect of the present invention there is provided an apparatus for reducing transmitter feed-through (Tx-FT) interference at a receiver of a modem operating at a first sampling rate to obtain a desired receive (Rx) signal having a spectrum at a carrier frequency for input into a QAM demodulator operating at a second sampling rate, said apparatus comprising: (a) an analog filter having a filter mask for attenuating the Tx-FT interference to a first prescribed level and for passing the Rx signal at the carrier frequency; (b) a converter for converting output from the analog filter to a digital representation; (c) a first digital filter having a mask for passing the Rx signal at the carrier frequency and for attenuating the Tx-FT interference to a second prescribed level; (d) a mixer for shifting the carrier frequency of the spectrum of the Rx signal to an intermediate frequency, said mixer introducing at least one spectral transmitter feed-through image Tx-FT(I) and a receive signal image Rx(I); (e) a second digital filter having a mask for passing the Rx signal at the intermediate frequency and attenuating the image spectrums Tx-FT(I) and Rx(I); and (f) a decimator for downsampling the Rx signal at a downsampling rate from the second digital filter to match the second sampling rate of the QAM demodulator.

In accordance with an aspect of the present invention there is provided an apparatus for reducing radio frequency (RF) interference at a receiver of a modem to obtain a desired receive (Rx) signal having a spectrum at a carrier frequency for input into a QAM demodulator operating at a sampling rate, said apparatus comprising: (a) an analog filter having a filter mask for attenuating the RF interference to a first prescribed level and for passing the Rx signal at the carrier frequency; (b) a converter for converting output from the analog filter to a digital representation; (c) a first digital filter having a mask for passing the Rx signal at the carrier frequency and attenuating the RF interference to a second prescribed level; (d) a mixer for shifting the carrier frequency of the spectrum of the Rx signal to an intermediate frequency, said mixer introducing a receive signal image Rx(I); (e) a second digital filter having a mask for passing the Rx signal at the intermediate frequency and attenuating the image spectrum Rx(I) and the RF interference to a third prescribed level; and (f) a decimator for downsampling the Rx signal at a downsampling rate from the second digital filter to match the sampling rate of the QAM demodulator.

In accordance with an aspect of the present invention there is provided a method of filtering interference in a receiver of a modem to obtain a desired receive (Rx) signal having a spectrum at a carrier frequency, said method comprising: (a) attenuating interference to a first prescribed level and passing the Rx signal at the carrier frequency; (b) converting output of the analog filtering means to a digital representation; (c) shifting the carrier frequency of the spectrum of the Rx signal to an intermediate frequency; and (d) attenuating the interference at levels above the intermediate frequency.

In accordance with an aspect of the present invention there is provided a method of reducing transmitter feed-through (Tx-FT) interference at a receiver of a modem operating at a symbol rate to obtain a desired receive (Rx) signal having a spectrum at a carrier frequency for input into a QAM demodulator operating at a sampling rate, said method comprising the steps of: (a) attenuating the Tx-FT interference to a first prescribed level and passing the Rx signal at the carrier frequency; (b) converting output from the analog filter to a digital representation; (c) passing the Rx signal at the carrier frequency and for attenuating the Tx-FT interference to a second prescribed level; (d) shifting the carrier frequency of the spectrum of the Rx signal to an intermediate frequency, said mixer introducing at least one spectral transmitter feed-through image Tx-FT(I) and a receive signal image Rx(I); (e) passing the Rx signal at the intermediate frequency and attenuating the image spectrums Tx-FT(I) and Rx(I); and (f) downsampling the Rx signal at a downsampling rate from the second digital filter to match the sampling rate of the QAM demodulator.

In accordance with an aspect of the present invention there is provided a method of reducing radio frequency (RF) interference at a receiver of a modem to obtain a desired receive (Rx) signal having a spectrum at a carrier frequency for input into a QAM demodulator operating at a sampling rate, said method comprising the steps of: (a) attenuating the RF interference to a first prescribed level and for passing the Rx signal at the carrier frequency; (b) converting output from the analog filter to a digital representation; (c) passing the Rx signal at the carrier frequency and attenuating the RF interference to a second prescribed level; (d) shifting the carrier frequency of the spectrum of the Rx signal to an intermediate frequency, said mixer introducing a receive signal image Rx(I); (e) passing the Rx signal at the intermediate frequency and attenuating the image spectrum Rx(I); and (f) downsampling the Rx signal at a downsampling rate from the second digital filter to match the sampling rate of the QAM demodulator.

BRIEF DESCRIPTION OF THE DRAWINGS

The present invention will be described in conjunction with the drawings in which:

FIGS. 2A, 2B and 3A, 3B illustrate spectral responses of signals operating in low baud rate mode during various processing points in the receiver of FIG. 1; and FIGS. 4A, 4B and 5A, 5B illustrate the spectral responses of signals operating in high baud rate mode during various processing points in the receiver of FIG. 1.

DETAILED DESCRIPTION OF EMBODIMENTS OF THE INVENTION

Figure 1A:
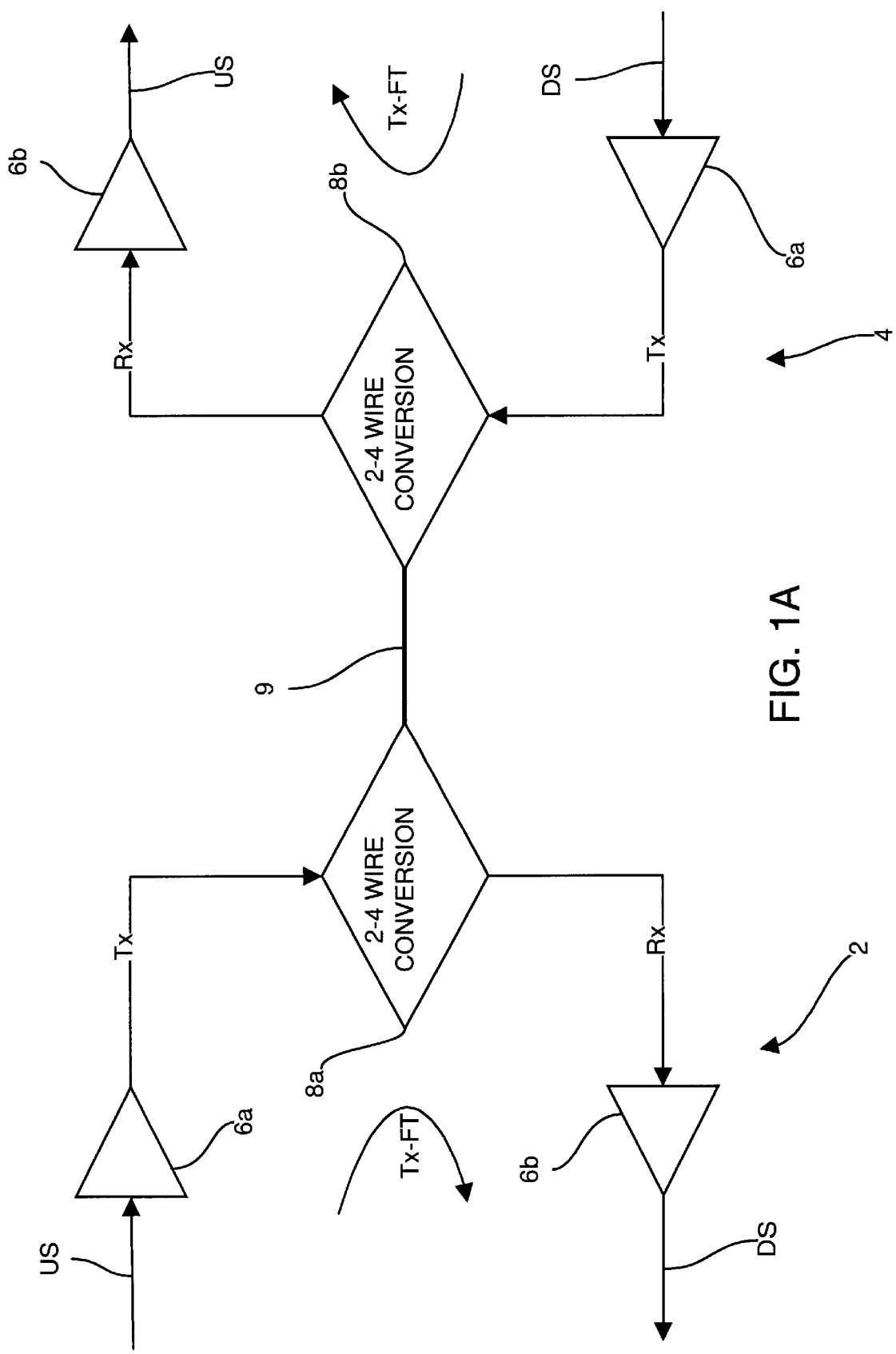
FIG. 1A illustrates a DSL communication system showing transmission and receiving paths between customer premise equipment and a central office.

FIG. 1A illustrates a general block diagram of communications between a customer premise equipment (CPE) 2 and a central office (CO) 4. The upstream signal (US) at the CPE 2 passes through a transmitter 6a to a 2 to 4 wire conversion module 8a to send the signal over a subscriber loop 9 for receipt by a second 2 to 4 wire conversion module 8b of the central office 4. The signal is then processed through a receiver 6b for subsequent upstream processing. A similar path is followed by a downstream (DS) signal from the central office 4 through the transmitter 6a to the wire conversion module 8b over the subscriber line 9 to the wire conversion module 8a of the CPE 2 and ultimately to the receiver 6b for subsequent downstream processing.

The curved lines labelled Tx-FT in the CPE 2 and the CO 4 represent transmitter feed-through signals that are being filtered based on the method and apparatus of the present invention. The subsequent description of the present invention concentrates on the downstream component. However, the same principles are used in the upstream direction.

Table A1 shows the spectrum allocations used for the downstream (DS) direction.

TABLE A1

|  | WIDEBAND (kHz) | NARROWBAND (kHz) |
| --- | --- | --- |
| frequency bands | 160–320 | 160–200 |
| bandwidth | 160 | 40 |
| carrier frequencies | 240 | 180 |

Figure 1B:
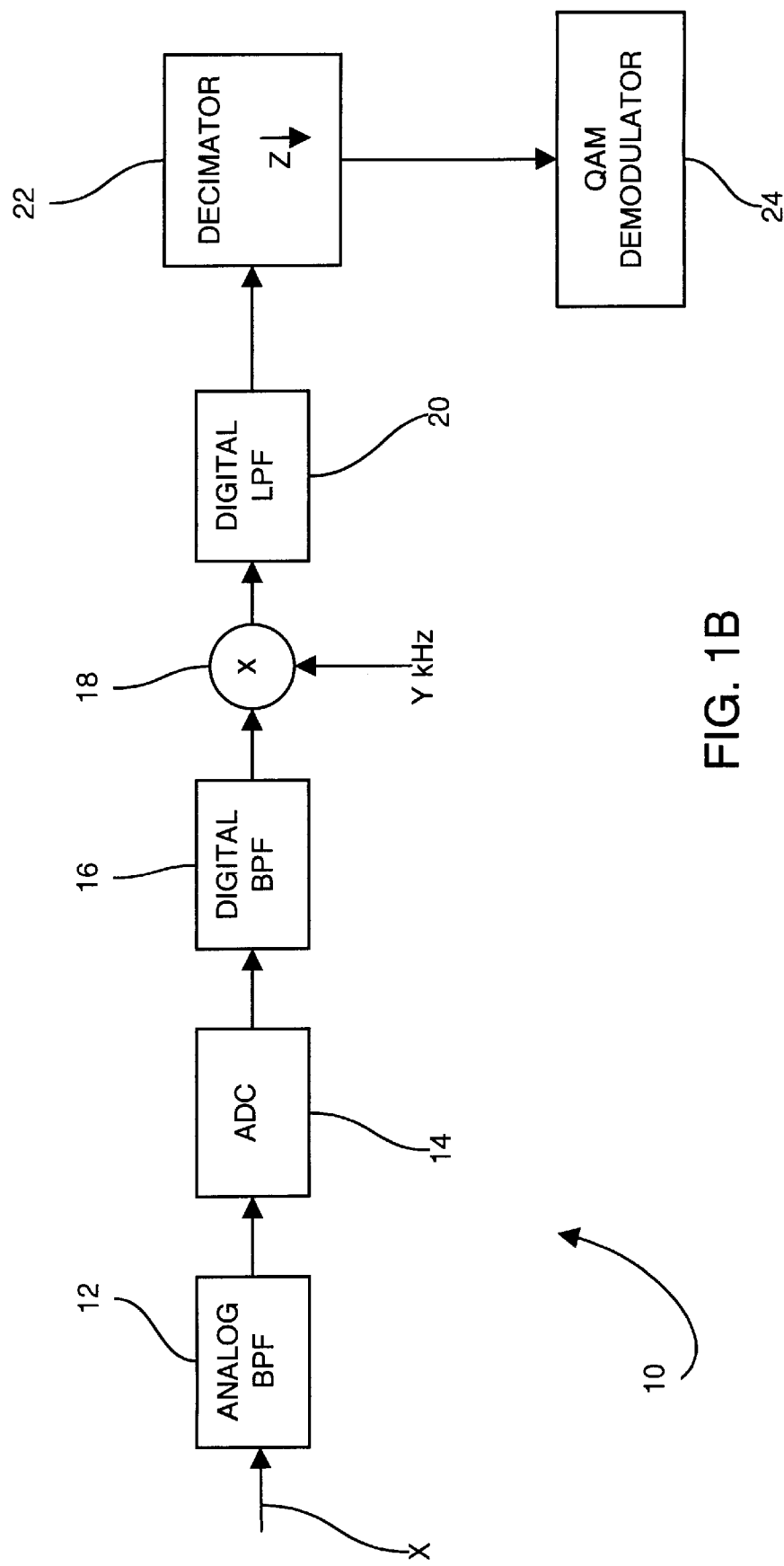
FIG. 1B illustrates a block diagram of a receiver incorporating the filtering apparatus of the present invention.

The main mixing and filtering portion of a receiver 10 of a modem is shown in FIG. 1B. The receiver 10 includes an analog band pass filter (BPF) 12 that receives an input signal X. The analog filter 12 attenuates transmitter feed-through (Tx-FT) and RF interference. The analog BPF 12 is a low to medium order analog filter (e.g. 4th order Chebyshev). Transmitter feed-through is a type of self-interference caused by a transmitter signal feeding back into the receiver 10 due to imperfect transhybrid cancellation in the 2–4 wire conversion modules 8a and 8b. The filtered signal X is then passed to a analog-to-digital converter 14 to digitize the signal X.

A digital band pass filter (BPF) 16 and a digital low pass filter (LPF) 20 attenuate to negligible levels the spectral content imposed by the transmitter feed-through and spectral images generated by a mixer 18 during mixing operations. The filter set 16 and 20 also attenuate a direct current (DC) that may be introduced in the receiver 10 by the ADC 14. The digital filters 16 and 20 are standard finite impulse response (FIR) type filters. Examples of specific design parameters for the filters 16 and 20 are provided hereinbelow in conjunction with the description of FIGS. 2 to 5. The mixer 18 shifts the carrier frequency of the spectrum from the range required by a transmission media (e.g. subscriber loop) to that of an intermediate frequency (IF) carrier. The mixing rate Y kHz varies depending on the baud rate of the modem.

The output from the digital filter 20 is downsampled to match the sampling rate of a QAM demodulator 24 (which runs at 4× the symbol rate) by a decimator 22 operating at a downsampling rate of Z. The downsampling rate Z varies depending on the baud (or symbol) rate of the modem. The decimation function is performed in order to bring the signal to a sampling frequency equal to 4 times the symbol rate, to simplify demodulation.

FIGS. 2A/B, 3A/B, 4A/B, and 5A/B illustrate spectral response graphs to provide examples of signal processing through the receiver 10 according to the present invention. The filtering method of the present invention will be discussed with reference to specific filter configurations having specific filtering masks. However, it is readily understood by those skilled in the art that the choice of filter parameters are a design issue and can be readily modified to suit various operating environments.

The analog filter 12 attenuates transmitter feed-through Tx-FT and RF interference RF1 and RF2 and passes a received signal Rx spectrum based on a filter mask 98 as shown in FIG. 2A and FIG. 4A. The mask 98 can be implemented using a bandpass filter with 20 to 50 dB attenuation in the RF and FT parts of the spectrum. The results of the attenuated Tx-FT and RF1 and RF2 are shown in FIGS. 2B/4B. RF1f represents a foldback of RF1 (shown as a dotted line in FIGS. 2B/4B because it is beyond the frequency of interest).

After sampling at 1280 kHz (as used in the present example), any signal with frequencies higher than fxs/2=640 kHz gets folded back into the 0–640 kHz band. Therefore, for wideband, any signal between 960–1120 kHz would fold back inband (i.e. 160–320 kHz). Subsequent digital filtering helps to remove directly interference below 640 kHz, as well as those foldback frequencies that do not fold into the band of interest.

The filtered analog signal is digitized into QAM data signals by the ADC 14 at a sampling rate fs of 1280 kHz (for both low (40 k) and high (160 k) baud rate modes). This sampling rate, through the Nyquist sampling theorem, will preserve any received frequency less than or equal to one-half of the sampling frequency (i.e. fs/2=640 kHz) and will fold back into frequencies less than fs/2 any frequencies beyond fs/2. This is shown in FIGS. 2B and 4B where the transmitter feed-through signal (Tx-FT) is located below 640 kHz {fs/2}.

The digital filter 16 located after the ADC 14 but before the mixer 18 assists in further attenuating the effects of the Tx-FT spectrum and RF interference signals RF1$f$ and RF2. Since the digital filter 16 assists in bringing down the level of RF interference to a reasonable level the analog filter 12 design is simplified. FIG. 2B illustrates the desired received signal Rx spectrum and the unwanted feed-through signal (Tx-FT) spectrum for low baud rates.

FIG. 4B illustrates the desired received signal Rx spectrum and the unwanted feed-through signal (Tx-FT) spectrum for high baud rates. A filter mask 100 of the filter 16 is shown in the graphs of FIGS. 2B and 4B illustrating the first stage in eliminating the unwanted signal component Tx-FT and further attenuation of RF interference. Signal processing after filter 16 is specific to the baud rate of the receiver 10. Two general categories are discussed: low baud rate and high baud rate.

The filter mask 100 essentially reduces to negligible levels the RF interference and the Tx-FT signal and as a result those signals are not illustrated in subsequent drawings to simplify the drawings.

Low Baud Rate Signal Processing

Once the desired received signal Rx has been filtered by digital filter 16 its spectrum is shifted to an intermediate frequency of 40 kHz required by the QAM demodulator 24 as illustrated in FIG. 3A. This is performed by mixing the Rx spectrum centered at 180 kHz with a 220 kHz (Y) tone by mixer 18. A multiplier in the mixer 18 accommodates for the fact that the ratio of the sampling rate of 1280 kHz to the mixing frequency 220 kHz is not a 4:1 ratio. A 4:1 ratio is considered ideal since it simplifies demodulation and in the art is termed fs/4 mixing.

Mixing of the Rx spectrum with the 220 kHz tone shifts the Rx spectrum to 40 kHz, but also generates an unwanted image of the desired signal spectrum Rx(I) at 400 kHz and feed-through images Tx-FT(I) at 140 kHz and 300 kHz. The spectral diagram of FIG. 3A shows the desired signal Rx and its unwanted image Rx(I) as well as the unwanted feed-through images Tx-FT(I). FIG. 3A also illustrates a filter mask 102 of the digital filter 20 required to filter everything (including out of band RF interference) except the desired signal Rx spectrum entered at 40 kHz. In the present low baud rate example the filter 20 is a 40 tap linear-phase (symmetrical coefficients) low-pass filter.

As discussed above, the mixing and filtering operations in the low baud rate mode operate at a sampling frequency of fs=1280 kHz. The sampling frequency fs is reduced to a 160 kHz {fs/8} sampling frequency of the demodulator 24 through the use of the decimator 22 (i.e. fs downsampled by a factor of eight=fsx⅛=fs/8. The sampling frequency at that point is fs/8 which means in FIG. 3B all the spectrum remains or is folded into the band between 0 and fs/16 (fs/8×½). For low baud rate mode, the decimator 22 uses a decimation factor of eight (i.e. only one in eight consecutive data samples are retained for further processing—the remaining seven are discarded).

The decimation and filter functions can also be performed by the filter 20 through the use of a polyphase filter known in the art. The Rx spectrum after the effects of the filter mask 102 and decimation by eight is shown in FIG. 3B. The unwanted feed-through images Tx-FT(I), the received signal image Rx(I) and RFI have been largely attenuated.

High Baud Rate Signal Processing

Once the digitized signal has been filtered by digital filter 16 its spectrum is shifted to an intermediate frequency of 160 kHz required by the QAM demodulator 24 as illustrated in FIG. 5A. This is performed by mixing the Rx spectrum centered at 240 kHz with a 400 kHz (Y) tone by mixer 18 using a multiplier.

Mixing of the Rx spectrum with the 400 kHz tone shifts the Rx spectrum to 160 kHz, but also generates an unwanted image of the desired signal spectrum Rx(I) at 560–640 kHz as well as the unwanted feed-through images Tx-FT(I) at 320 kHz and 480 kHz. With respect to Rx(I), since 640K is aliasing frequency, half of spectrum falls on top of itself with the entire image appearing between 560–640 kHz. The spectral diagram of FIG. 5A shows the desired signal Rx and its unwanted image Rx(I) as well as the unwanted feed-through images Tx-FT(I). FIG. 5A illustrates a filter mask 104 of the digital filter 20 required to filter the unwanted signals (including RF interference) except the desired signal Rx spectrum centered at 160 kHz. In the present high baud rate example the filter 20 is a 14 tap linear-phase (symmetrical coefficients) low-pass filter.

As discussed above, the mixing and filtering operations in the high baud rate mode operate at a sampling frequency of fs=1280 kHz. The sampling frequency f(s) is reduced to a 640 kHz {fs/2} sampling frequency of the demodulator 24 through the use of the decimator 22 (i.e. fs downsampled by a factor of two=fsx½=fs/2). The sampling frequency at that point is fs/2 which means in FIG. 5B the limit of the band of interest is between 0 and fs/4 (fs/2×½). For high baud rate mode, the decimator 22 uses a decimation factor of two (i.e. only one in two consecutive data samples are retained for further processing). The decimation and filter functions can also be performed by the filter 20 through the use of a polyphase filter known in the art.

The Rx spectrum after the effects of the filter mask 104 and decimation by two is shown in FIG. 5B. A majority of the unwanted feed-through images Tx-FT(I), the signal image Rx(I) and RFI have been heavily attenuated. The portion of Tx-FT(I) and Rx(I) (Rx(I) was folded from the 560–640 kHz band to the 0–80 kHz band) remaining have been attenuated to effectively eliminate the impact of the feed-through image Tx-FT(I) and Rx(I) on the much stronger (higher amplitude) received signal Rx as shown in FIG. 5B. Further, since the remaining interferences Tx-FT(I) and Rx(I) are not overlapping with the Rx signal, they can be filtered out by subsequent Nyquist filtering usually located in the demodulator 24.

In summary, interference rejection in the receiver is divided between analog and digital filters. The filters are designed to account for the worst-case interference level and its contribution at the analog-to-digital converter (ADC) input to ensure that the dynamic range of the ADC still provides enough SNR for the received signal. Further, self-interference caused by the transmitter signal is reduced by the analog filters and further reduced by the digital filters after the ADC or after digital mixing for upstream or downstream reception. Interference from AM stations is reduced by analog filters, and further reduced another 30 db by digital filters after the ADC.

What is claimed is:

1. An apparatus for reducing transmitter feed-through (Tx-FT) interference at a receiver of a modem operating at a first sampling rate to obtain a desired receive (Rx) signal having a spectrum at a carrier frequency for input into a QAM demodulator operating at a second sampling rate, said apparatus comprising:

(a) an analog filter having a filter mask for attenuating the Tx-FT interference to a first prescribed level and for passing the Rx signal at the carrier frequency;
   (b) a converter for converting output from the analog filter to a digital representation;
   (c) a first digital filter having a mask for passing the Rx signal at the carrier frequency and for attenuating the Tx-FT interference to a second prescribed level;
   (d) a mixer for shifting the carrier frequency of the spectrum of the Rx signal to an intermediate frequency, said mixer introducing at least one spectral transmitter feed-through image Tx-FT(I) and a receive signal image Rx(I);
   (e) a second digital filter having a mask for passing the Rx signal at the intermediate frequency and attenuating the image spectrums Tx-FT(I) and Rx(I); and
   (f) a decimator for downsampling the Rx signal at a downsampling rate from the second digital filter to match the second sampling rate of the QAM demodulator.

2. The apparatus of claim 1, wherein the second sampling rate of the QAM demodulator is four times the first symbol rate of the receiver.

3. The apparatus of claim 2, wherein the first prescribed level of attenuation of the Tx-FT interference is approximately 50 dB.

4. The apparatus of claim 3, wherein the second prescribed level of attenuation of the Tx-FT interference is approximately 30 dB.

5. The apparatus of claim 4, wherein the second prescribed level of attenuation of the Tx-FT interference is reduction to effectively zero.

6. The apparatus of claim 3, wherein the intermediate frequency is less than fs/2 divided by the downsampling rate.

7. The apparatus of claim 1, wherein the converter operates at a sampling rate fs to preserve received spectrums less than or equal to fs/2.

8. An apparatus for reducing radio frequency (RF) interference at a receiver of a modem to obtain a desired receive (Rx) signal having a spectrum at a carrier frequency for input into a QAM demodulator operating at a sampling rate, said apparatus comprising:

(a) an analog filter having a filter mask for attenuating the RF interference to a first prescribed level and for passing the Rx signal at the carrier frequency;
   (b) a converter for converting output from the analog filter to a digital representation;
   (c) a first digital filter having a mask for passing the Rx signal at the carrier frequency and attenuating the RF interference to a second prescribed level;
   (d) a mixer for shifting the carrier frequency of the spectrum of the Rx signal to an intermediate frequency, said mixer introducing a receive signal image Rx(I);
   (e) a second digital filter having a mask for passing the Rx signal at the intermediate frequency and attenuating the image spectrum Rx(I) and the RF interference to a third prescribed level; and
   (f) a decimator for downsampling the Rx signal at a downsampling rate from the second digital filter to match the sampling rate of the QAM demodulator.

9. The apparatus of claim 8, wherein the third prescribed level of attenuation of the RF interference is reduction to a negligible level.

10. The apparatus of claim 8, wherein the converter operates at a sampling rate fs to preserve received spectrums less than or equal to fs/2.

11. The apparatus of claim 10, wherein the intermediate frequency is less than fs/2 divided by the downsampling rate.

12. A method of reducing transmitter feed-through (Tx-FT) interference at a receiver of a modem operating at a symbol rate to obtain a desired receive (Rx) signal having a spectrum at a carrier frequency for input into a QAM demodulator operating at a sampling rate, said method comprising the steps of:

(a) attenuating the Tx-FT interference to a first prescribed level and passing the Rx signal at the carrier frequency;
   (b) converting output from an analog filter to a digital representation;
   (c) passing the Rx signal at the carrier frequency and for attenuating the Tx-FT interference to a second prescribed level;
   (d) shifting the carrier frequency of the spectrum of the Rx signal to an intermediate frequency, said mixer introducing at least one spectral transmitter feed-through image Tx-FT(I) and a receive signal image Rx(I);
   (e) passing the Rx signal at the intermediate frequency and attenuating the image spectrums Tx-FT(I) and Rx(I); and
   (f) downsampling the Rx signal at a downsampling rate from a second digital filter to match the sampling rate of the QAM demodulator.

13. The method of claim 12, wherein the sampling rate of the QAM demodulator is four times the symbol rate of the receiver.

14. The method of claim 13, wherein the first prescribed level of attenuation of the Tx-FT interference is approximately 50 dB.

15. The method of claim 14, wherein the second prescribed level of attenuation of the Tx-FT interference is approximately 30 dB.

16. The method of claim 15, wherein step (e) attenuates the Tx-FT interference to effectively zero.

17. The method of claim 13, wherein the step of converting comprises operating a converter at a sampling rate fs to preserve received spectrums less than or equal to fs/2.

18. The method of claim 17, wherein the intermediate frequency is less than fs/2 divided by the downsampling rate.

19. A method reducing radio frequency (RF) interference at a receiver of a modem to obtain a desired receive (Rx) signal having a spectrum at a carrier frequency for input into a QAM demodulator operating at a sampling rate, said method comprising the steps of:

(a) attenuating the RF interference to a first prescribed level and for passing the Rx signal at the carrier frequency;
   (b) converting output from an analog filter to a digital representation;

(c) passing the Rx signal at the carrier frequency and attenuating the RF interference to a second prescribed level;

(d) shifting the carrier frequency of the spectrum of the Rx signal to an intermediate frequency, said mixer introducing a receive signal image Rx(I);

(e) passing the Rx signal at the intermediate frequency and attenuating the image spectrum Rx(I); and (f) downsampling the Rx signal at a downsampling rate from a second digital filter to match the sampling rate of the QAM demodulator.

20. The method of claim 19, wherein step (e) attenuates the Rx(I) interference to a negligible level.

21. The method of claim 20, wherein the step of converting comprises operating a converter at a sampling rate fs to preserve received spectrum less than or equal to fs/2.

22. The method of claim 21, wherein the intermediate frequency is less than fs/2 divided by the downsampling rate.

* * * * *

UNITED STATES PATENT AND TRADEMARK OFFICE
CERTIFICATE OF CORRECTION

PATENT NO. : 6,240,150 B1
DATED : May 29, 2001
INVENTOR(S) : Michel Darveau et al.

It is certified that error appears in the above-identified patent and that said Letters Patent is hereby corrected as shown below:

<u>Column 7,</u>
Lines 43-45, claim 5 is amended to read as follows:
-- The apparatus of claim 4, wherein the second digital filter level of attenuation of the Tx-FT interference is reduction to effectively zero. --

Signed and Sealed this

Twenty-sixth Day of August, 2003

JAMES E. ROGAN
*Director of the United States Patent and Trademark Office*